United States Patent [19]

Reis et al.

[11] 3,924,754
[45] Dec. 9, 1975

[54] APPARATUS FOR TRANSPORTING WORKPIECES

[75] Inventors: Walter Reis, Obernburg; Dietmar Boll, Elsenfeld, both of Germany

[73] Assignee: Walter Reis, Obernburg, Germany

[22] Filed: May 29, 1974

[21] Appl. No.: 474,333

[30] Foreign Application Priority Data
June 5, 1973 Austria .............................. 4904/73
Apr. 26, 1974 Germany............................ 2420240

[52] U.S. Cl. .......................... 214/1 BD; 214/147 T
[51] Int. Cl.² ........................................... B25J 13/00
[58] Field of Search ..... 214/1 BD, 1 B, 1 BS, 1 BV, 214/309, 8.5 C, 8.5 D, 147 T

[56] References Cited
UNITED STATES PATENTS
3,232,446  2/1966  Spurr ................................ 214/1 BD
3,294,256  12/1966  Nazali ............................... 214/1 BD
3,459,313  8/1969  Upton .............................. 214/1 BD
3,693,321  9/1972  Nilsson ......................... 214/8.5 D X Primary Examiner—Frank E. Werner
Assistant Examiner—George F. Abraham
Attorney, Agent, or Firm—W. G. Fasse; W. W. Roberts

[57] ABSTRACT

The present workpiece transporting apparatus is arranged between two operating stations such as a die casting machine and a trimming press. A transport arm is journaled at one end to an axis extending substantially horizontally to the axis of at least one of the operating stations. A tilting arm is journaled to the free end of the transport arm about a second axis extending in parallel to the first mentioned axis. A tool means such as grippers are secured to the free end of the tilting arm. Drive means are connected to the transport arm and to the grippers. The apparatus may be controlled in response to the work sequence of one or the other or both operating stations.

9 Claims, 6 Drawing Figures

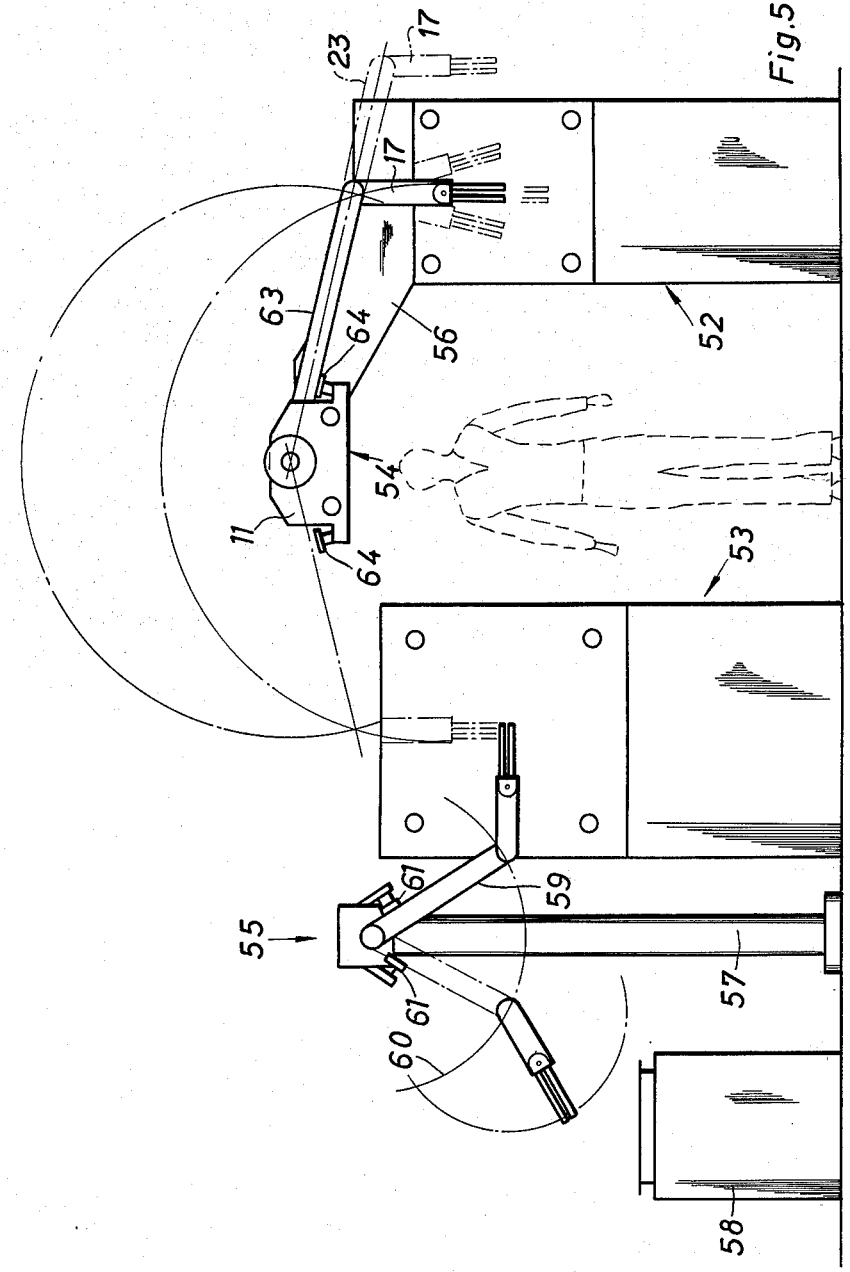

APPARATUS FOR TRANSPORTING WORKPIECES

BACKGROUND OF THE INVENTION

The invention relates to an apparatus for transporting a workpiece from one work or operating station to another, for example, from a pressure die casting machine to a trimming press. If desired, the workpiece may be transported into or through a cooling device located between the die casting machine and the trimming press. For this purpose the present apparatus includes a transport arm and a gripping device. The present apparatus may be controlled in its work sequence by one and/or the other operating station in response to the work sequence of said station or stations.

Such an apparatus has been proposed heretofore. In the previous apparatus the transport arm is arranged for movement along a guide rail. The transport arm is further guided in the vertical direction for raising and lowering the known transport arm in that direction.

Such devices are relatively complicated and hence expensive, especially because it is necessary to arrange the guide rail above the pressure die casting machine and above the trimming press.

OBJECTS OF THE INVENTION

In view of the above it is the aim of the invention to achieve the following objects singly or in combination:

to provide an apparatus of the type described above which is simpler in its construction and assembly and which is suitable for universal usability;

to provide an apparatus which is capable of moving a workpiece into an overhead position and/or through an arc of more than 180°;

to construct the present apparatus in a compact manner so that it will require but little space between the two operating or work stations such as a die casting machine and a trimming press;

to provide means which will assure a parallel guide and control of two tiltable work transport means such as a transport arm and a tilting arm to which the workpiece gripping means are secured;

to provide two independently operable work transport arms and tool transport arms to, for instance, lubricate a workpiece right after its removal from one work station;

to coordinate the movements of the seveal workpiece handling means in such a manner that substantial time savings are realized;

to construct the present apparatus in such a manner that it may easily be integrated in existing plants or assemblies;

to minimize the costs; and to arrange the masses in such a manner that high work speeds and hence cooperation with rapidly operating automats is possible.

SUMMARY OF THE INVENTION

According to the invention there is provided a workpiece transport apparatus having a transport arm supported on a base frame for tilting about a substantially horizontal first axis extending in parallel to at least one work station, such as a die casting machine, wherein a gripping device is tiltably supported at the free end of the transport arm by means of a tilting arm which is tiltable about a second axis extending in parallel to said first mentioned axis, whereby the workpiece may be transported overhead and/or through an arc of more than 180° about this second axis, and wherein drive means for the transport arm are arranged on the substantially horizontal, first mentioned axis. Control means known as such may be provided for controlling the movement of the apparatus as a function of the operation of one and/or the other work station with which the present apparatus cooperates.

It is a special advantage of the apparatus according to the invention that it requires but little space in the center to center distance between, for example, a pressure die casting machine and a trimming press and that but a small structural height needs to be accommodated.

In a suitable further embodiment of the invention parallel guide means are connected with the transport arm for the parallel guiding of the gripping device. The parallel guide means comprises, for example, two sprocket wheels of equal size of which one is supported on the journal or tilting axis of the transport arm and held in a fixed position relative to the base frame, whereas the other sprocket wheel is arranged at the pivot point of the tilting arm and rigidly secured to the gripping device. Both sprocket wheels are interconnected with each other by a chain.

In the instance where a cooling station is arranged between the pressure die casting machine and the trimming press, the transport arm may be supported on a carriage which is guided on the base frame in the axial direction of the tilting axis and shiftable in the longitudinal direction. In this embodiment, the transport arm may be moved out of the tilting plane and into a plane extending in parallel to the cooling station.

BRIEF FIGURE DESCRIPTION

In order that the invention may be clearly understood, it will now be described, by way of example, with reference to the accompanying drawings, wherein:

FIG. 5 is a front view illustrating an examplary use of an apparatus according to the invention.

DETAILED DESCRIPTION OF EXAMPLE EMBODIMENTS

Figure 1:
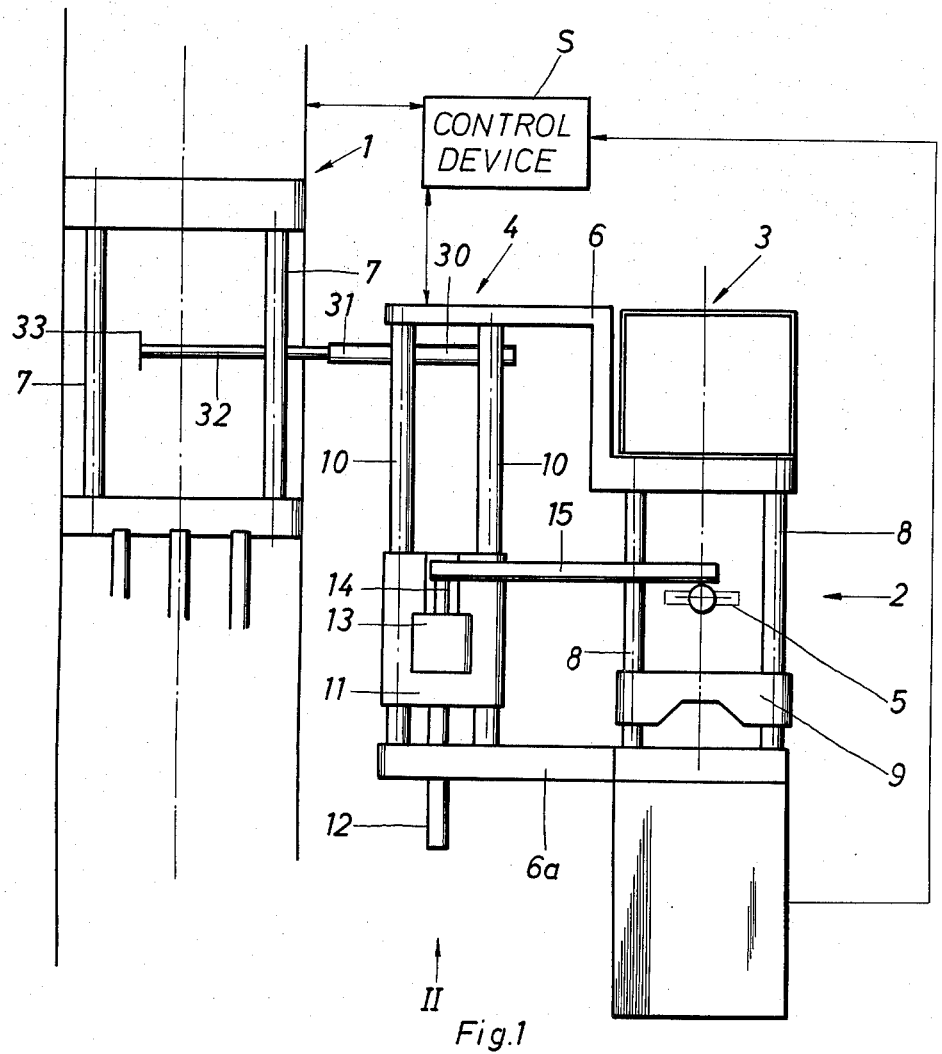
FIG. 1 shows a top view of a transport apparatus according to the invention arranged, for example, between a pressure die casting machine and a trimming press.
Figure 3:
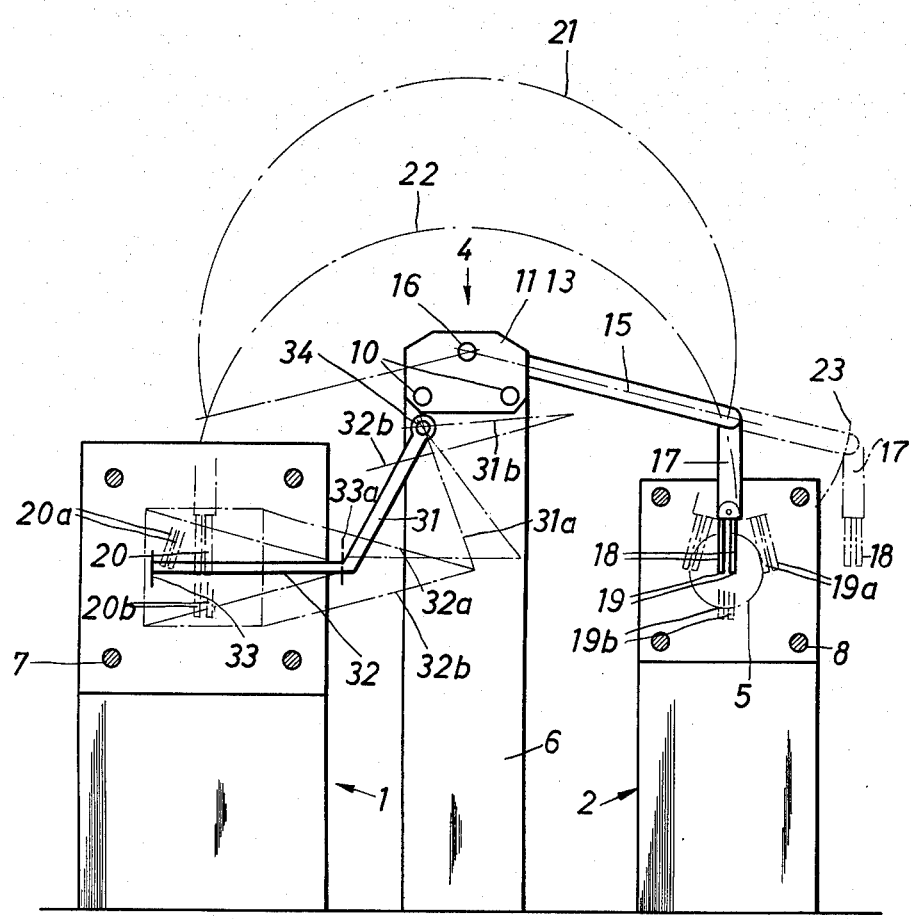
FIG. 3 illustrates a front view in the direction of the arrow II in FIG. 1.

A first work or operating station such as a pressure die casting machine 1 is shown in FIGS. 1 and 3. A further work station such as a trimming press 2 is also shown in FIGS. 1 and 3. The longitudinal axes of both machines are arranged substantially in parallel to each other and are extending horizontally. In the top view of FIG. 1, there is also schematically shown a cooling device 3. For example, the cooling device 3 may be constructed in the form of a dipping tank.

In the simplified illustrations a transport apparatus 4 is arranged between the pressure die casting machine 1 and the trimming press 2 for transporting a workpiece 5 from the pressure die casting machine into the trimming press.

The apparatus 4 comprises a base frame 4a with side frame members 6 and 6a which are connected in the shown exemplary embodiment to the trimming press 2 by means of flanges.

In an alternative embodiment, the base frame may, however, comprise a single upright member resting on the floor of a work shop.

A control device 8 controls the work sequence of the apparatus according to the invention in response to the work sequence of the pressure die casting machine 1 and/or of the control of the trimming press and/or any other additional devices.

Only the guide columns 7 of the pressure die casting machine are shown. The trimming press is illustrated by its guide columns 8 as well as by its movable base plate 9. The apparatus 4 according to the invention will now be described in more detail as follows.

Guide rails 10 are arranged between the face plates 6 and 7. A carriage 11 is movable on the guide rails 10. The shifting movement of the carriage 11 is accomplished by means of a hydraulic drive 12.

The carriage 11 carries a drive device 13, for example, an electric motor having attached thereto a reduction gear box. A transport arm 15 is supported on the shaft 14 of this drive device 13 for tilting the transport arm and thus the tilting arm about a horizontal axis 16. A tilting arm 17 is pivoted to the free end of the transport arm 15. A workpiece gripping device 18 is pivoted to the free end of the tilting arm 17. Said gripping device comprises two tong-type jaws 19 which may be opened and closed by their respective own drive, for example, a hydraulic drive device 18a for controlling the gripping device.

FIG. 3 illustrates that the free end of the transport arm 15 is guided along an arc 21 so that the jaws 19 are moved from their shown position in the trimming press to the position 20 after the opening of the pressure die casting mold. The jaws 19 pick up the workpiece in the latter position, whereby the gripping jaws 19 move along an arc 22.

The tilting arm 17 is movable independently of the transport arm 15. In FIG. 3 there is shown additionally, the possibility of securing a movable extension arm 23 between the transport arm 15 and the tiling arm 17, whereby an even better movability and motion sequence of the gripping device 18 is made possible, for instance for a dipping or depositing movement of the tongs.

The tiltability of the tilting arms 17 serves for bringing the gripping jaw 19 into other positions depending on the shape of the workpiece, for example, into the end positions 19a and 19b inside the trimming press 2. The same holds true for the end positions 20a and 20b in the pressure die casting machine 1.

Figure 4A:
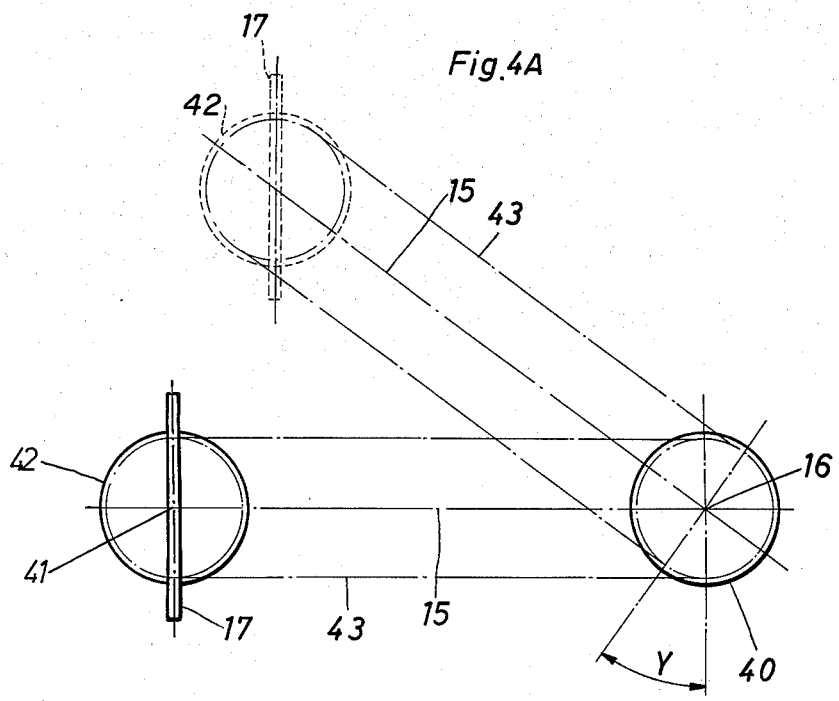
FIG. 4A illustrates schematically a device for the controlling the tilt of the transport members suitable for use in connection with the apparatus according to the invention.

A device for controlling the tilt of the tilting arm 17 is illustrated schematically in FIG. 4A. A sprocket wheel 40 is arranged on the tilting axis 16 of the transport arm 15. The sprocket wheel 40 is rotatable by its own drive 39 comprising for instance an electromotor with a gear.

A further sprocket wheel 42 is arranged at the free end of the transport arm 15 on the pivot axis 41 of the tilting arm 17. The sprocket wheel 42 is freely rotatable. The two sprocket wheels 40 and 42 are linked with a chain 43. Thus, a tilting motion of the transport arm 15 through any desired tilting angle may be accomplished when the sprocket wheel 40 is held in a fixed position without the need for tilting the tilting arm 17 out of its original position, that is, in the example shown, out of its vertical position.

Figure 4B:
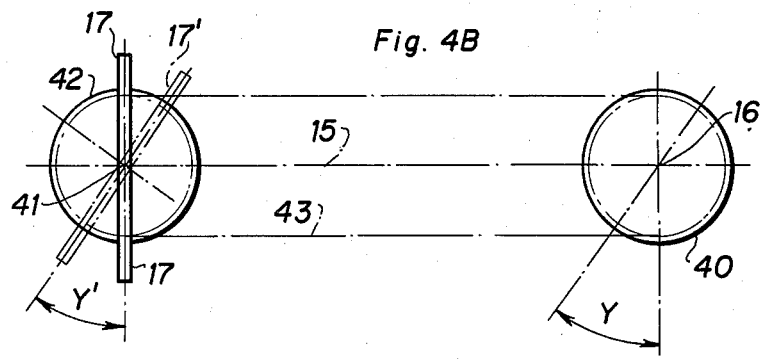
FIG. 4B illustrates schematically the device of FIG. 4A for varying the tilt of the transport members.

However, if the sprocket wheel 40 is rotated by means of its drive 39 by an angle Y, as shown in FIG. 4B, the tilting arm 17 is also tilted by an angle Y' into a position 17'.

The two sprocket wheels 40 and 42 cooperating with the chain 43 cause a parallel guiding of the tilting arm 17 during the motion of the transport arm 15.

The purpose of this relative tiltability of the tilting arm 17 has been explained above, and constitutes an additional feature which is significant for a broadened use of the die casting machine and also for a modified use of the apparatus according to the invention.

Another equivalent drive connection may be employed instead of the sprocket wheels and chain, for example, a V-belt drive may be employed. The described parallel guide constitutes an especially simple constructive solution, however.

A second carriage 30 is additionally supported on guide rails 34. The carriage 30 carries a drive device and on the shaft of the drive device an arm 31. A further arm 32 is pivoted to the end of the arm 31. The free end of the arm 32 supports a spraying device 33 for spraying out the pressure die casting mold, whereby the arm 31 is tiltable into the end positions 31a and 31b, whereas the arm 32 is tiltable between the end positions 32a and 32b. In the rest position the spraying device assumes the position 33a adjacent to the pressure die casting machine.

The motion sequence of the spraying device and of its holding arms 31 and 32 is controllable as a function of the shape of the pressure casting mold, for example, by sensing means and respective control means responsive to said sensing means.

The invention is not limited to the schematically illustrated example embodiment, rather equivalent features may be employed within the bounds of the gist of the invention, and other feature combinations may be employed as well.

It is essential for the invention that the transport arm carrying the gripper means and the transport arm carrying the spraying device are controllable independently of each other. Thus, it is possible to lubricate the molds immediately following the removal of a workpiece out of the mold. The transport motion and the motion of the second arm take place simultaneously so that in the entire sequence of work steps, a substantial time saving may be accomplished.

The longitudinal shiftability of the carriage carrying the first and second transport arm makes it possible to serve molds of different shapes adjacent to the die casting machine and adjacent to the trimming press. This feature also makes it possible to provide an additional cooling device, for example, at the front side of the trimming press. The tilting arm which is additionally secured to the first transport arm contributes significantly toward this goal. The controlled tilting movement of the gripping device 19 about its pivot point 41 at the first transport arm 15 or at the extension arm 23 makes it possible to take up differently shaped workpieces and to deposit such workpieces because the areas of the workpiece provided for the gripping cannot be located at the same spot in all differently shaped workpieces. Thus, there is the possibility to place said respective area or a respective boss at a spot which is best suitable for this gripping purpose having regard to the shape of the workpiece.

Figure 2:
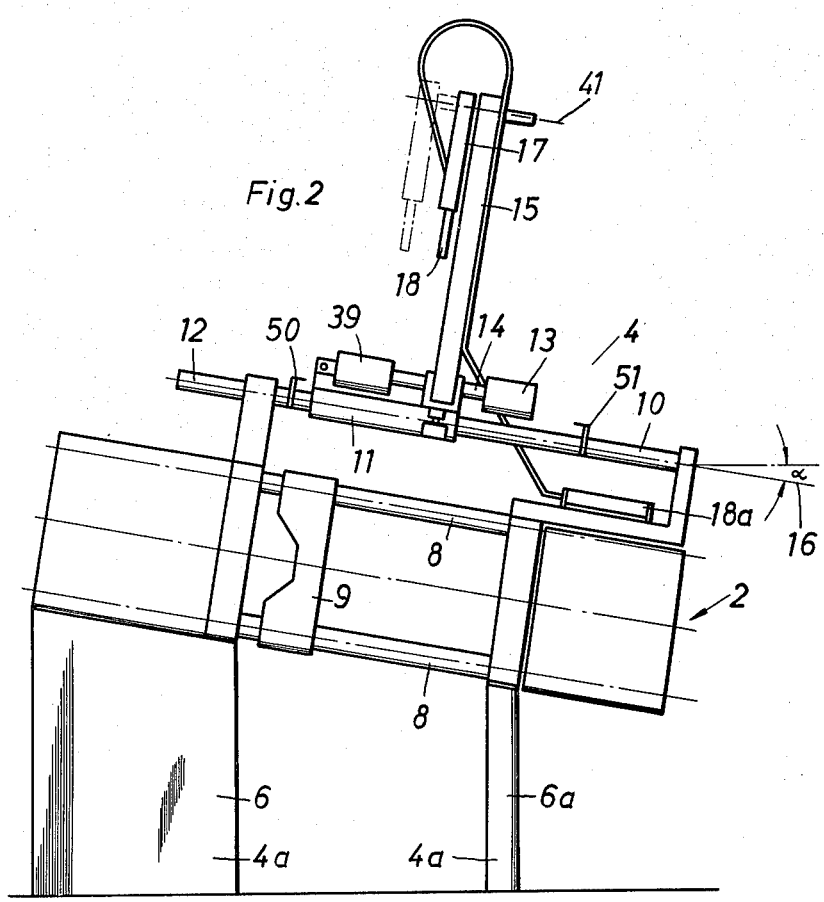
FIG. 2 shows a side view of the apparatus according to FIG. 1.

Although in the foregoing description, it was assumed that the tilting axis 16 of the transport arm extends horizontally, FIG. 2 shows a side view with an axis 16' tilted backwardly and downwardly. The angle between the horizontal and the tilted axis 16' may range from 0° up to 20°. An advantage of this arrangement resides in that the carriage 11 extends in parallel to a pressure die casting machine which is arranged at a respective slope. This arrangement makes it possible to require but two motion axes even where the die casting machine is arranged at a slope.

The travel or excursion of the carriage 11 in the longitudinal direction may be controlled by means of adjustable limit switches 50, 51. A corresponding simple control possibility may also be employed for the transport arm 15. The control device S may thus be realized in a very simple manner.

Another advantage of the apparatus according to the invention resides in that in the illustrated embodiment, the least possible masses are supported by the movable elements. Thus, these movable elements do not carry any drive means. Said drive means are supported exclusively by the main axis, namely, the tilting axis 16.

In the example illustrating a use as shown in FIG. 5, the transport apparatus 54 according to the invention is secured by means of a flange 56 to the trimming press 52. This arrangement saves floor space between the trimming press 52 and the die casting machine 53 so that an optimal utilization of a work shop floor space is possible.

A further apparatus 55 according to the invention is located on a column 57 between the die casting machine 53 and a conveyor mechanism 58. In this apparatus the transport arm 59 operates along an arc 60 extending downwardly. The apparatus 55 is arranged for this purpose in an upside down manner. For this type of use it is sufficient to construct the apparatus 55 in a simpler fashion without the carriage 11. The motion of the transport arm is limited by limit switches 61 adjustably secured to a support flange 62.

The transport arm 63 of the transport device 54 operates between limit switches 64 adjustably secured to the carriage 11.

As has been stated above, the base frame of the apparatus according to the invention may be constructed differently if it is to be installed subsequently into an existing plant. Besides, it is insignificant, whether the individual drive means are of the hydraulic or electric kind. Thus, it is seen, that the different combinations of features according to the invention offer their own advantages depending on the type of use.

Essentially the combination will depend on those advantages which are especially needed for the particular type of use. The essential advantages are summarized here again. The invention realizes a simple machine construction with few bearing and motion points resulting in advantageous, low production costs and a high safety of operation. Due to the short distance through which the workpiece moves and due to the advantageous mass distribution of the machine elements high working speeds are possible, whereby the apparatus may be employed in connection with rapidly operating automats which was not possible heretofore. The shortest possible time durations are achieved for any series of work steps. The die casting mold is open whereby a higher output of the entire arrangement is assured.

The arms 31, 32, 33 shown in FIG. 3 may perform other motions independently of the gripping device 18 aside from the described lubricating of the casting mold. For example, it is possible to use these arms for the insertion of steel core members.

Two drive means 13 and 39 are shown in FIG. 2 as being located on the tilting axis 14. However, basically only one drive means could be provided which could be coupled either with the transport arm or with the sprocket wheel 40 by means of an alternately effective clutch.

Although the invention has been described with reference to specific example embodiments, it is to be understood, that it is intended to cover all modifications and equivalents within the scope of the appended claims.

What is claimed is:

1. An arrangement for transporting workpieces from one operating station to another, comprising base frame means, guide means supported on said base frame means, carriage means supported on said guide means for movement substantially parallel to at least one of said operating stations, means for moving said carriage on said guide means, a transport arm having first and second ends, means journaling said first end of said transport arm to said carriage means for supporting said arm for rotation about a first axis substantially parallel to said one operating station, drive means positioned on said first axis and operatively coupled to said first end of said transport arm, a tilting arm having one end journaled to said second end of said transport arm about a second axis parallel to said first axis, workpiece gripping means pivoted to the other end of said tilting arm, whereby a workpiece held by said gripping means is movable through an angle of more than 180° about said first axis, tilt control means for said gripping means comprising a first sprocket mounted coaxially on said first axis, a second sprocket affixed to said tilting arm coaxially at said second axis, said first and second sprockets having equal diameter, chain means interconnecting said first and second sprockets and means independent of the position of said transport arm for fixing the angular position of said first sprocket with respect to said frame means, and drive means coupled to said workpiece gripping means and mounted on said frame means.

2. The apparatus according to claim 1, wherein said means for fixing the angular position of said first sprocket comprises further drive means operatively connected to said first sprocket for rotating the first sprocket relative to said base frame means.

3. The apparatus according to claim 2 wherein said further drive means are arranged on said first axis about which said transport arm is rotable.

4. The apparatus according to claim 1, further comprising a second transport arm, tool means secured to said second transport arm, and means on said frame means journaling said second transport arm about a third axis substantially parallel to said first axis.

5. The apparatus according to claim 4, wherein said tool means comprise spraying means secured to said second transport arm.

6. The apparatus according to claim 1, wherein the first axis extends at a slant relative to the horizontal whereby an angle between said first axis and the horizontal may be within the range of 0° to 20°.

7. The apparatus according to claim 1, further comprising motion control means in the form of limit switches.

8. The apparatus according to claim 1, further comprising motion control means responsive to at least one of said operating stations and operatively connected to said apparatus for controlling the motions of said arms.

9. The arrangement of claim 1, wherein said guide means comprises a pair of parallel spaced apart guide rails for slidably supporting said carriage means, said drive means for said transport arm comprises a motor mounted on said carriage means and having a shaft extending coaxially with said first axis, said one end of said transport arm being affixed to said shaft, and wherein said means for fixing the angular position of said first sprocket comprises a further drive motor mounted at said first axis.

* * * * *